US010125663B2

(12) United States Patent
Arbel

(10) Patent No.: US 10,125,663 B2
(45) Date of Patent: Nov. 13, 2018

(54) THERMOSTAT ASSEMBLY WITH PRESSURE COMPENSATION

(71) Applicant: M.A.P MOTORAD AUTOMOTIVE PARTS LTD., Misgav (IL)

(72) Inventor: Aviram Arbel, Hod Hasharon (IL)

(73) Assignee: M.A.P MOTORAD AUTOMOTIVE PARTS LTD., Misgav (IL)

( * ) Notice: Subject to any disclaimer, the term of this patent is extended or adjusted under 35 U.S.C. 154(b) by 0 days.

(21) Appl. No.: 15/561,061

(22) PCT Filed: Mar. 24, 2016

(86) PCT No.: PCT/IL2016/050318
§ 371 (c)(1),
(2) Date: Sep. 24, 2017

(87) PCT Pub. No.: WO2016/151590
PCT Pub. Date: Sep. 29, 2016

(65) Prior Publication Data
US 2018/0073420 A1 Mar. 15, 2018

Related U.S. Application Data

(60) Provisional application No. 62/137,833, filed on Mar. 25, 2015.

(51) Int. Cl.
*F01P 7/16* (2006.01)
*G05D 23/13* (2006.01)
*F01P 7/14* (2006.01)

(52) U.S. Cl.
CPC .................. *F01P 7/16* (2013.01); *F01P 7/14* (2013.01); *F01P 7/167* (2013.01);
(Continued)

(58) Field of Classification Search
CPC .......... F01P 2007/146; F01P 7/16; F01P 7/12; F01L 9/025; F16K 31/122; F16K 31/1264
See application file for complete search history.

(56) References Cited

U.S. PATENT DOCUMENTS 4,674,679 A 6/1987 Saur
5,657,722 A * 8/1997 Hollis ..................... F01P 7/167
123/41.08

(Continued)

FOREIGN PATENT DOCUMENTS

EP 2037097 3/2009
EP 2366878 9/2011

(Continued)

*Primary Examiner* — Long T Tran
(74) *Attorney, Agent, or Firm* — The Roy Gross Law Firm, LLC; Roy Gross

(57) ABSTRACT

A thermostat for controlling flow of a coolant fluid through an aperture, the thermostat including a temperature sensitive valve for controlling the opening and closing of the aperture, the temperature sensitive valve including: a valve body with a heat sensitive material and a displaceable pin; a flange configured to seal off the aperture, a support member; and a flexible member located between the flange and the support member; the thermostat further including a piston configured to control compression of the flexible member from a bottom end thereof; and a hydraulic pressure compensation element connected to the flange and configured to compensate for a hydraulic pressure exerted by the coolant fluid on a lid of the temperature sensitive valve.

19 Claims, 7 Drawing Sheets

(52) U.S. Cl.
CPC .... *G05D 23/1333* (2013.01); *F01P 2007/146* (2013.01); *F01P 2025/46* (2013.01)

(56) References Cited

U.S. PATENT DOCUMENTS

| | | |
|---|---|---|
| 6,742,716 B1 | 6/2004 | Duprez et al. |
| 6,764,020 B1 | 7/2004 | Zhao et al. |
| 2006/0113399 A1* | 6/2006 | Maraux .................. F01P 7/167 236/93 R |
| 2009/0173295 A1 | 7/2009 | Fishman et al. |
| 2013/0074789 A1 | 3/2013 | Borgia et al. |
| 2015/0027386 A1* | 1/2015 | Lewis ...................... F01P 7/16 123/41.1 |
| 2015/0369113 A1* | 12/2015 | Arbel ...................... F01P 7/16 236/34.5 |
| 2016/0281587 A1* | 9/2016 | Arbel ...................... F01P 7/165 |

FOREIGN PATENT DOCUMENTS

| | | |
|---|---|---|
| WO | 2008078888 | 7/2008 |
| WO | 2013151486 | 10/2013 |

\* cited by examiner

THERMOSTAT ASSEMBLY WITH PRESSURE COMPENSATION

This application is a 35 U.S.C. § 371 national phase application of PCT/IL2016/050318, filed Mar. 24, 2016, which claims priority to U.S. 62/137,833 filed on Mar. 25, 2015. All applications are incorporated herein by reference as if fully set forth.

TECHNICAL FIELD

The present disclosure generally relates to the field of thermostat assemblies for controlling a flow of a fluid through an aperture.

BACKGROUND

Thermostats are extensively used to control the circulation of coolant in internal combustion engines. Typically, thermostats include valves having a closed body containing a thermally expandable material, such as wax. A spring is provided to urge the valve to a closed position such that in the resting or cooled state the valve is normally closed. Hence, when the engine is first started, the valve is closed, allowing only a bypass circulation of coolant fluid between the engine and the thermostat, thereby enabling the engine to attain its optimum running temperature more quickly.

Once the engine temperature rises, the temperature of the bypass circulated fluid increases, causing the wax within the valve body to melt and expand, consequently thrusting out a piston. As a result, the thrusted out piston causes the displacement of the valve from the valve seat, allowing flow of coolant fluid from a radiator to the engine. As the engine temperature drops, the wax temperature falls, the valve closes, returning to bypass circulation only.

There is still an unmet need for a device which is capable of fine-tuning the opening and closing of the valve on demand, to enable high, lower and/or higher Start-to-Open (STO) temperature.

SUMMARY

The present disclosure relates to thermostat assemblies having a hydraulic pressure compensation element configured to compensate for the hydraulic pressure exerted by coolant fluid on the valve flange.

State of the art thermostats typically require the engine designer to determine an optimum engine temperature by deciding on properties of the wax, the spring urging the valve to be closed and/or additional parameters influencing the STO temperature of the valve. However, often there is a need for user modification of the STO temperature. For example, an engine operating at a higher temperature allows more complete fuel combustion and thereby produces less emission. Moreover, higher operating temperature improves fuel economy. On the other hand, a hotter running engine delivers less power. Thus, any single optimum engine temperature is a compromise between power, fuel economy and emissions level.

Advantageously, the thermostat, disclosed herein, enables adjustment of the STO temperature by increasing a pre-load of the valve spring and, as a result thereof, affecting an elevation of the STO temperature. This may be particularly beneficial at the beginning of a drive and/or at low ambient temperatures in that it prevents unnecessary cooling of a cold engine, thereby improving fuel economy and also reducing pollution.

Advantageously, the thermostat, disclosed herein, includes a hydraulic pressure compensation element configured to compensate for the hydraulic pressure exerted by coolant fluid on the valve lid and/or flange. Due to the pressure compensation, the spring needed to urge the valve to a closed position might have a lower spring constant than that typically used in thermostats, such as thermostats typically used in combustion engines. This again significantly reduces the force required to increase the pre-load of the spring and, thus, enables control of the pre-load of the spring by exerting a compression force on the spring from a bottom end thereof, for example, by the use of a piston, which, when heightened, increases the pre-load of the spring and consequently increases the STO temperature of the valve. As the force required to increase the pre-load of a valve spring is reduced, the thermostat, disclosed herein, may retain a similar size to standard thermostat assemblies and advantageously facilitates replacing the standard thermostat assembly with the adjustable valve seat thermostat, without requiring additional adjustments or modification of the engine.

Furthermore, by controlling the degree of pressure compensation provided by the hydraulic pressure compensation element, the STO temperature may be further adjusted. For example, by actively lowering the position of the hydraulic pressure compensation element, the temperature sensitive valve can be forced open, thereby enabling opening the valve prior to the temperature having reached the predetermined STO temperature. This allows the coolant to flow through the engine at a lower temperature, thereby reducing and maintaining a cooler engine temperature, for example, for high performance turbo applications.

According to some embodiments, there is provided a thermostat for controlling flow of a coolant fluid through an aperture.

According to some embodiments, the thermostat may include a temperature sensitive valve for controlling the opening and closing of the aperture. According to some embodiments, the temperature sensitive valve may include a valve body with a heat sensitive material and a displaceable pin; wherein the displaceable pin is at least partially inserted within the heat sensitive material.

According to some embodiments, the temperature sensitive valve may include a flange configured to delimit the temperature sensitive valve from a top end thereof. According to some embodiments, the flange may be configured to seal against a valve seat when the temperature sensitive valve is closed.

According to some embodiments, the temperature sensitive valve may include a support member configured to delimit the temperature sensitive valve from a bottom end thereof.

According to some embodiments, the temperature sensitive valve may include a flexible member located between the flange and the support member. According to some embodiments, when the heat sensitive material is heated, the displaceable pin is at least partially displaced from the valve body, thereby affecting a compression force on the flexible member, the compression force gradually displacing the temperature sensitive valve from the valve seat, thereby allowing flow of coolant fluid through said aperture.

According to some embodiments, the thermostat may include a piston configured to control compression of the flexible member from a bottom end thereof.

According to some embodiments, the thermostat may include a hydraulic pressure compensation element connected to the flange and configured to compensate for a hydraulic pressure exerted by the coolant fluid on a lid of the temperature sensitive valve. According to some embodiments, when the temperature sensitive valve is opened, the hydraulic pressure compensation element may be lowered to a lower position. According to some embodiments, the thermostat may include an actuator configured to control the operation of the hydraulic pressure compensation element. According to some embodiments, the actuator, when activated, may be configured to reduce a degree of compensation provided by the hydraulic pressure compensation element. According to some embodiments, when the actuator is activated and the degree of compensation is reduced, a start-to-open (STO) temperature of the temperature sensitive valve may be lowered, as compared to when the actuator is not activated. According to some embodiments, when the actuator lowers the hydraulic pressure compensation element into a lower position, the temperature sensitive valve is displaced from the valve seat.

According to some embodiments, the piston may be connected to the flexible member.

According to some embodiments, the piston may be configured to switch between a normal position and a heightened position. According to some embodiments, when the piston is in its heightened position, the piston exerts a compression force on the flexible member. According to some embodiments, when the piston is in its heightened position, a STO temperature of the temperature sensitive valve may be heightened, as compared to when the piston is in its normal position.

According to some embodiments, the position of the support member may be fixed.

According to some embodiments, the flexible member may be a spring. According to some embodiments, the spring may have a spring constant of 100 Newton/meter or less. According to some embodiments, the spring may have a spring constant of 50 Newton/meter or less.

According to some embodiments, the heat sensitive material may include a wax.

According to some embodiments, the temperature sensitive valve may be a linear characteristic valve.

According to some embodiments, there is provided a thermostat system for controlling a temperature of an engine.

According to some embodiments, the system may include a radiator configured to cool a coolant fluid.

According to some embodiments, the system may include a temperature sensitive valve for controlling the opening and closing of the aperture. According to some embodiments, the temperature sensitive valve may include a valve body with a heat sensitive material and a displaceable pin; wherein the displaceable pin is at least partially inserted within the heat sensitive material. According to some embodiments, the temperature sensitive valve may include a flange configured to delimit the temperature sensitive valve from a top end thereof. According to some embodiments, the flange may be configured to seal against a valve seat when the temperature sensitive valve is closed. According to some embodiments, the temperature sensitive valve may include a support member configured to delimit the temperature sensitive valve from a bottom end thereof. According to some embodiments, the temperature sensitive valve may include a flexible member located between the flange and the support member. According to some embodiments, when the heat sensitive material is heated the displaceable pin is at least partially displaced from the valve body, thereby affecting a compression force on the flexible member, the compression force gradually displacing the temperature sensitive valve from the valve seat, thereby allowing flow of coolant fluid through the aperture.

According to some embodiments, the system may include a piston configured to control compression of the flexible member from a bottom end thereof.

According to some embodiments, the system may include a hydraulic pressure compensation element connected to the flange and configured to compensate for a hydraulic pressure exerted by the coolant fluid on a lid of the temperature sensitive valve.

According to some embodiments, the system may include a bypass circuitry configured to circulate the coolant fluid between the engine and the thermostat.

According to some embodiments, the system may include a pump configured to pump coolant fluid from the thermostat to the engine.

Certain embodiments of the present disclosure may include some, all, or none of the above advantages. One or more technical advantages may be readily apparent to those skilled in the art from the figures, descriptions and claims included herein. Moreover, while specific advantages have been enumerated above, various embodiments may include all, some or none of the enumerated advantages.

BRIEF DESCRIPTION OF THE DRAWINGS

Examples illustrative of embodiments are described below with reference to figures attached hereto. In the figures, identical structures, elements or parts that appear in more than one figure are generally labeled with a same numeral in all the figures in which they appear. Alternatively, elements or parts that appear in more than one figure may be labeled with different numerals in the different figures in which they appear. Dimensions of components and features shown in the figures are generally chosen for convenience and clarity of presentation and are not necessarily shown in scale. The figures are listed below.

DETAILED DESCRIPTION

Figure 1A:
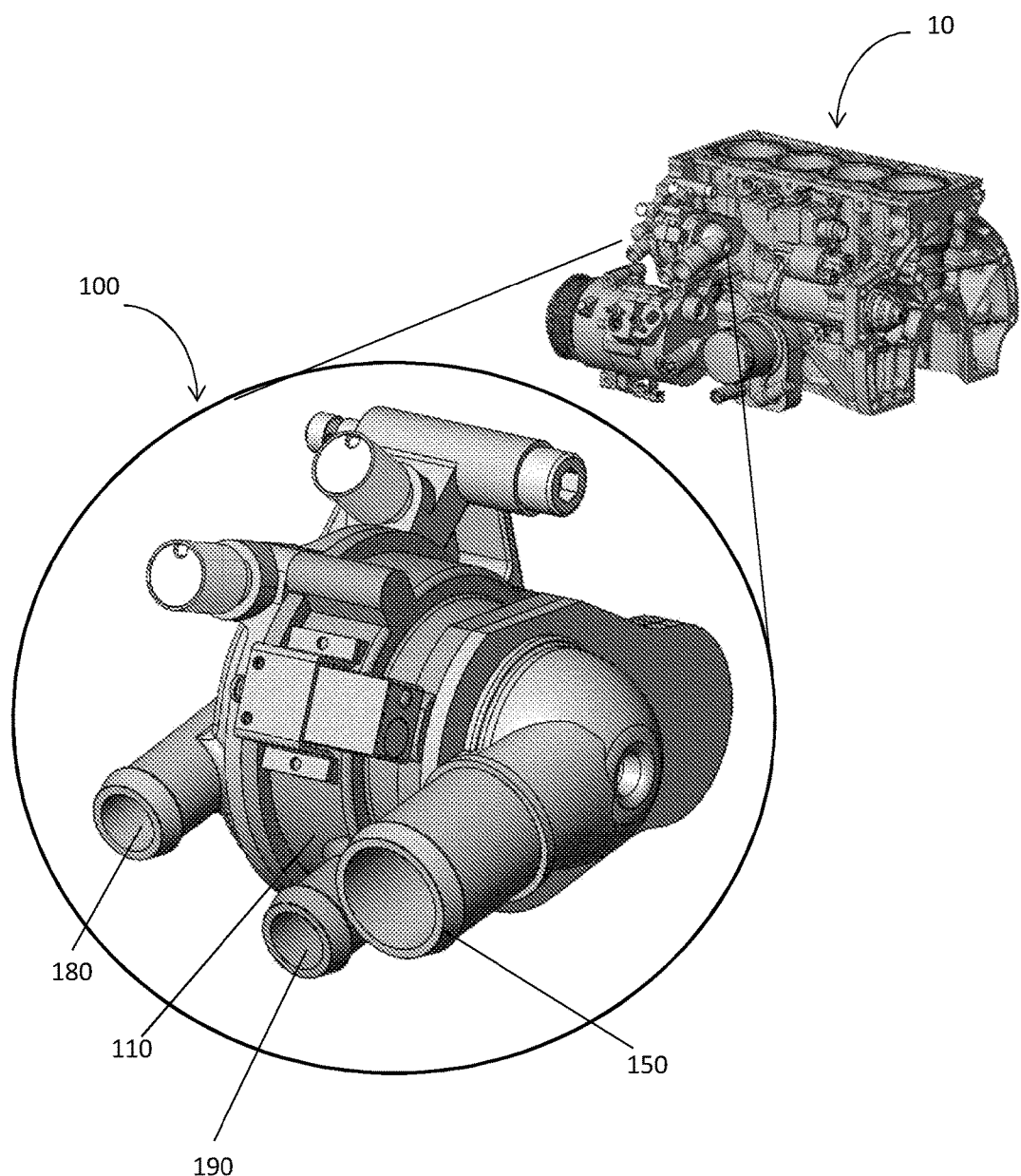
FIG. 1A schematically shows a combustion engine including an apparatus configured to control the flow of a coolant fluid thereto, according to some embodiments.

In the following description, various aspects of the disclosure will be described. For the purpose of explanation, specific configurations and details are set forth in order to provide a thorough understanding of the different aspects of the disclosure. However, it will also be apparent to one skilled in the art that the disclosure may be practiced without specific details being presented herein. Furthermore, well-known features may be omitted or simplified in order not to obscure the disclosure.

The present invention provides a thermostat for controlling a temperature of an engine by controlling flow from a heat exchanger, such as a radiator, to the engine. The thermostat includes a temperature sensitive valve for controlling the opening and closing of an aperture, through which the coolant fluid cooled by the radiator can enter the thermostat and subsequently the engine.

According to some embodiments, the temperature sensitive valve includes a displaceable and/or thermally actuated mechanism configured to allow opening of the temperature sensitive valve, in response to an increase in the temperature of the coolant fluid. The temperature sensitive valve further includes a flexible member, configured to exert pressure on the temperature responsive valve so as to resist opening of the valve and/or to force closing of the valve, when the temperature of the coolant fluid decreases. According to some embodiments, the flexible member may be a spring.

According to some embodiments, the temperature sensitive valve includes a valve body comprising a heat sensitive material and a displaceable pin. According to some embodiments, the displaceable pin may be at least partially inserted within the valve body and/or the heat sensitive material. According to some embodiments, the heat sensitive material may be a wax. According to some embodiments, the heat sensitive material may be configured to melt and expand at a temperature in the range of 90° C.-95° C., in the range of 91° C.-94° C. or in the range of 91° C.-93° C. Each possibility is a separate embodiment.

According to some embodiments, the valve may include a flange configured to delimit the temperature sensitive valve from a top end thereof. According to some embodiments, the flange may include a lid configured to close off the aperture through which coolant fluid enters the thermostat. According to some embodiments, the flange may have a form of a disc. According to some embodiments, the flange may be essentially flat. According to some embodiments, the flange may be essentially dome formed. According to some embodiments, at least part of the flange may have concave shape. According to some embodiments, the flange may have a size and shape configured to improve the flow characteristics of the coolant fluid through the aperture. According to some embodiments, the flange may be sized and shaped to ensure a gradual increase of flow of the coolant fluid throughout the opening of the valve. According to some embodiments, the flange may be sized and shaped to prevent a burst in the flow of coolant fluid through the aperture.

According to some embodiments, the thermostat may include a valve seat. As used herein, the term "valve seat" may refer to part of the thermostat against which the temperature sensitive valve seals. As used herein, the terms "aperture" and "opening" may be interchangeably used and may refer to the narrowest point through which the fluid passes into the thermostat. According to some embodiments, the valve seat may be functionally connected to the temperature sensitive valve.

According to some embodiments, the temperature sensitive valve may include a support member configured to delimit the temperature sensitive valve from a bottom end thereof. According to some embodiments, the support member may be a lower bridge. According to some embodiments, the support member may be fixed within the thermostat, thereby providing contra to a downward movement of the flange.

According to some embodiments, when the heat sensitive material is heated, the displaceable pin may be at least partially thrust out from the valve body. According to some embodiments, when the displaceable pin is thrust out from the valve body it may encounter a niche formed within the thermostat and configured to provide contra to the displacement of the displaceable pin, thereby affecting a compression force on the flexible member. According to some embodiments, the compression force exerted on the flexible member may gradually displace the temperature sensitive valve from the aperture, thereby allowing flow of coolant fluid from a radiator through the aperture.

According to some embodiments, when the valve seals off the aperture, the coolant fluid flows in a bypass circuitry between the engine and the thermostat.

According to some embodiments, when the valve is displaced from the seal, the coolant fluid flows through a heat exchanger, such as a radiator, where it gets cooled, prior to being circulated back to the engine.

According to some embodiments, the thermostat may further include a hydraulic pressure compensation element. As used herein, the term "hydraulic pressure compensation element" may refer to any element configured to compensate for the hydraulic pressure exerted by coolant fluid on the lid of the temperature sensitive valve. According to some embodiments, the hydraulic pressure compensation element may be a hydraulic piston. According to some embodiments, the hydraulic pressure compensation element may be functionally connected to a top end of the temperature sensitive valve. According to some embodiments, the hydraulic pressure compensation element may be functionally connected to the flange of the temperature sensitive valve. According to some embodiments, the hydraulic pressure compensation element may be functionally connected to the lid and/or flange of the temperature sensitive valve.

According to some embodiments, when the temperature sensitive valve is in its closed position, the default position of the hydraulic pressure compensation element is an elevated position configured to provide a maximum degree of pressure compensation for the pressure exerted by the coolant fluid on the lid of the temperature sensitive valve.

According to some embodiments, when the temperature sensitive valve is in its closed position, the default position of the hydraulic pressure compensation element is a lowered position in a manner proportional to the opening of the temperature sensitive valve.

According to some embodiments, the degree of compensation provided by the hydraulic pressure compensation element is unchanged between the open and closed configurations of the thermostat. According to some embodiments, the hydraulic pressure exerted by coolant fluid on the lid of the temperature sensitive valve is essentially unchanged between the open and closed configurations of the thermostat.

Due to the pressure compensation provided by the hydraulic pressure compensation element, the strength of the flexible member needed to urge the valve to a closed position may be lower. For example, the flexible member may be a spring having a lower spring constant than that typically used in thermostats, such as thermostats of combustion engines. According to some embodiments, the spring may have a spring constant of 150 Newton/meter or below, of 100 Newton/meter or below, of 75 Newton/meter or below; or of 50 Newton/meter or below. Each possibility is a separate embodiment.

Using a spring having a lower spring constant significantly reduces the force required to increase the pre-load on the spring. As used herein the term "pre-load" may refer to a degree of compression and/or stretching of the spring which is unrelated to engine temperature. According to some embodiments, the pre-load of the spring may thus be controlled by exerting a compression force on the spring from a bottom end thereof, as further described herein.

According to some embodiments, the thermostat may further include a piston configured to control (directly or indirectly) compression of the flexible member from a bottom end thereof. As used herein the terms "piston" and "control piston" may be interchangeably used and may refer to a mechanism configured to control the compression and/or pre-load of the flexible member (e.g. a spring). According to some embodiments, the piston may be a hydraulically activated piston. According to other embodiments, the piston may be a mechanically or an electromechanically activated piston.

According to some embodiments, the piston may be configured to switch at least between a normal position, a lower position and a heightened position. As used herein, the term "normal position" refers to a state in which the piston exerts no, or optionally a predetermined, default compression, on the flexible member. According to some embodiments, when the piston is in its normal position, the flexible member is in equilibrium and thus devoid of pre-load. As used herein, the term "equilibrium" refers to a state in which the flexible member is in its relaxed form, i.e. not being stretched or compressed. Alternatively, according to some embodiments, when the piston is in its normal position, a baseline/default compression is exerted on the flexible member. According to some embodiments, when the piston is in its normal position, the STO temperature of the temperature sensitive valve is a predetermined STO temperature, defined by the manufacturer. According to some embodiments, when the piston is in its normal position, the STO temperature of the temperature sensitive valve is 92° C.

The term "Start to Open (STO) temperature", as used herein, refers to a temperature range, at which the thermostat valve is configured to open and to allow coolant fluid flow from the radiator to the engine. As used herein, the term "predetermined STO temperature" may refer to the default STO temperature set by the manufacturer.

According to some embodiments, when the piston is in its heightened position, a compression force is exerted on the flexible member from a bottom end thereof. According to some embodiments, when the piston is in its heightened position, the pre-load on the flexible member is increased to a pre-load higher than that exerted when the piston is in its normal position. According to some embodiments, due to the increased pre-load on the spring, the start-to-open (STO) temperature required for displacing the temperature sensitive valve from the aperture is higher when the piston is in its heightened position, as compared to when the piston is in its normal position.

It is understood, that by varying the pre-load of the flexible member, the thermostat, disclosed herein, enables cooling of the engine, by opening the valve either at a predefined engine temperature and/or at an engine temperature defined by the instant engine demand. The thermostat is further configured to terminate cooling of the engine, at the predefined engine and/or at the temperature defined by the instant engine demand. The thermostat, disclosed herein, thus allows a more precise control of the engine temperature, which, in turn, allows improved fuel utilization and/or engine power, in line with the engine demand.

According to some embodiments, the thermostat, disclosed herein, may be configured to facilitate elevating the predetermined Start-to-Open (STO) temperature of the valve, thereby increasing the engine temperature and fuel utilization. According to some embodiments, the thermostat, disclosed herein, may be configured to facilitate lowering the predetermined Start-to-Open (STO) temperature of the valve, thereby increasing engine power.

According to some embodiments, the temperature sensitive valve may have a predetermined inherent flow characteristic, which defines the relationship between the valve opening and the flowrate under constant pressure conditions. It is understood that the relationship between flowrate and aperture pass area is directly proportional. However, different valve characteristics may give different valve openings for the same pass area. The physical shape of the valve and seat arrangement, sometimes referred to as the valve 'trim', causes a difference in valve opening between valves. According to some embodiments, the valve may be sized and shaped to improve the flow characteristics of the coolant fluid through the aperture.

According to some embodiments, the valve may be a fast opening valve. As used herein, the term "fast opening valve" may refer to a valve in which a small lift of the valve from the closed position results in a large change in flowrate. As a non-limiting example, a valve lift of 50% may result in an orifice pass area and flowrate of up to 90% of its maximum potential. According to some embodiments, the fast opening valve, its flange and/or lid may have a shape of a flipped flat bowl. According to some embodiments, the fast opening valve, its flange and/or lid may at least partially have a convex shape.

According to some embodiments, the valve may be a linear characteristic valve. As used herein, the term "linear characteristic valve" refers to a valve having a flowrate directly proportional to the valve lift, at a constant differential pressure. A linear valve achieves this by having a linear relationship between the valve lift and the orifice pass area. According to some embodiments, the linear characteristic valve, its flange and/or lid, may have a shape of a dome. According to some embodiments, the linear characteristic valve, its flange and/or lid, may at least partially have a concave shape.

According to some embodiments, the valve may be a logarithmic valve. As used herein, the term "logarithmic valve" refers to one in which each increment in valve lift increases the flowrate by a certain percentage of the previous flow. According to some embodiments, the linear characteristic valve, its flange and/or lid, may at least partially have a concave and a convex shape.

According to some embodiments, the thermostat may further include an actuator configured to control the operation of the hydraulic pressure compensation element. According to some embodiments, the actuator may be configured to override the default position of the hydraulic pressure compensation element. According to some embodiments, the actuator may reduce the degree of compensation provided by the hydraulic pressure compensation element. According to some embodiments, the actuator (when activated) may be configured to lower the position of the hydraulic pressure compensation element, when the valve is in its normally closed position (i.e. when the default position of the hydraulic pressure compensation element is an elevated position). According to some embodiments, lowering the position of the hydraulic pressure compensation element causes a compression of a flexible member from an upper end thereof (i.e. the end of the spring closest to the valve seat) and thereby an opening of the temperature sensitive valve. According to some embodiments, when the actuator is activated and the degree of compensation provided by the hydraulic pressure compensation element is reduced, the hydraulic pressure exerted by coolant fluid on the flange of the temperature sensitive valve is increased. According to some embodiments, when the actuator is activated and the degree of compensation provided by the hydraulic pressure compensation element is reduced, the start-to-open (STO) temperature of the temperature sensitive valve is lowered, as compared to when said actuator is not activated. According to some embodiments, when the actuator is activated and the degree of compensation provided by the hydraulic pressure compensation element is reduced, flow of coolant fluid from the heat exchanger to the thermostat is facilitated at a lower temperature and/or unrelated to the temperature of the coolant fluid.

Reference is now made to FIG. 1A which schematically shows a combustion engine 10 including an apparatus 100 configured to control the flow of a coolant fluid to combustion engine 10, according to some embodiments. Apparatus 100 includes a thermostat 110 configured to control the flow of coolant fluid from a radiator, through radiator passage 150 to engine 10 through engine passage 180. Apparatus 100 may further be configured to control the flow of coolant fluid to a reservoir/heater 190.

Figure 1B:
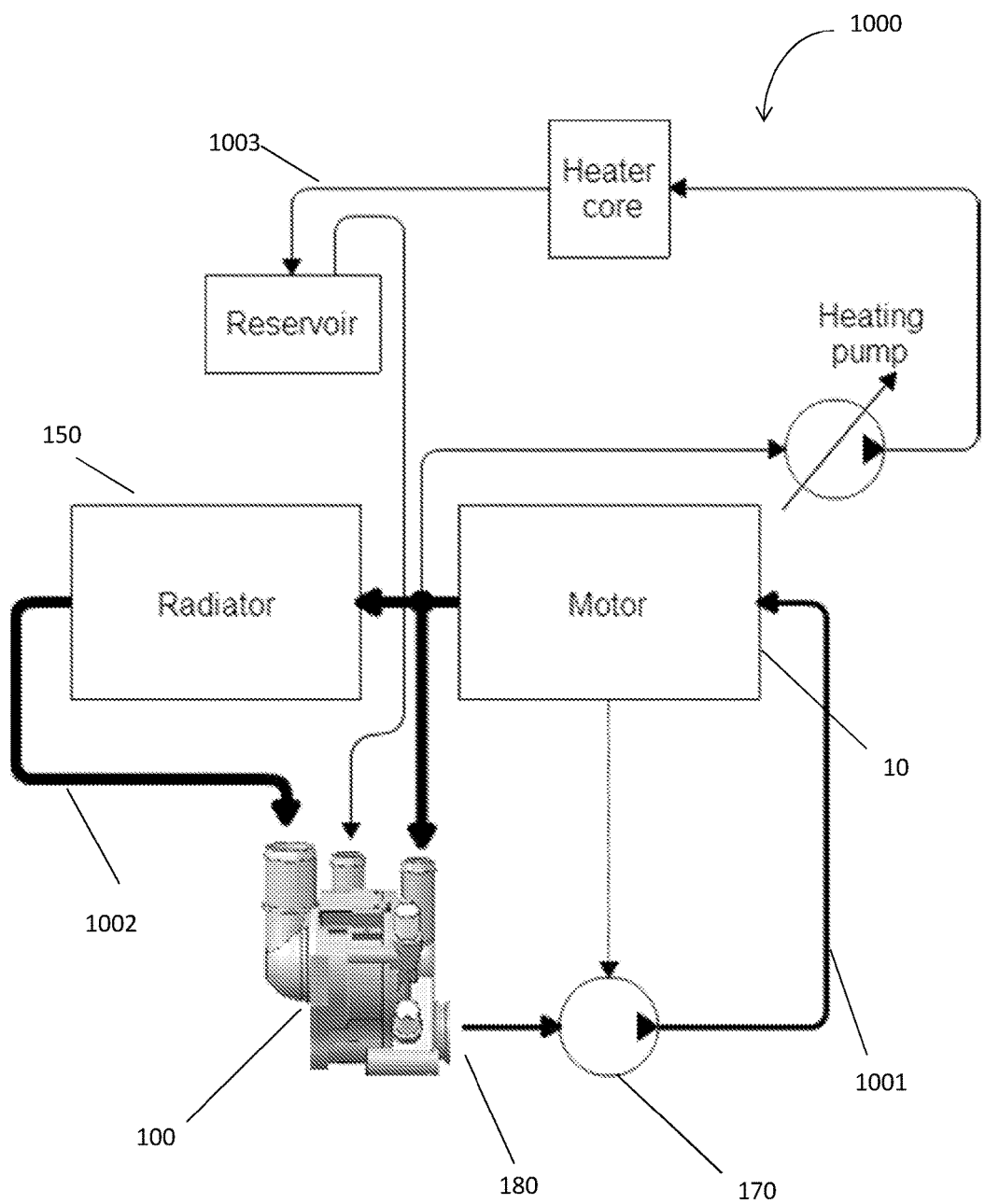
FIG. 1B shows an illustrative operation scheme of the apparatus shown in FIG. 1A, according to some embodiments.

Reference is now made to FIG. 1B which shows an illustrative operation scheme 1000 of an apparatus 100 (shown in FIG. 1A) configured to control the flow of a coolant fluid from a radiator to an engine, according to some embodiments. Apparatus 100 includes a thermostat (depicted as 110 in FIG. 1A) configured to block or allow flow of coolant fluid from a radiator (through a radiator passage depicted as 150 in FIG. 1A) to engine 10 through engine passage 180. When the coolant fluid is below an STO temperature, it circulates through bypass circuit 1001 between apparatus 100 and engine/motor 10 by the means of pump 170. However, as the temperature of the coolant fluid reaches the STO temperature of thermostat 110, a thermostat valve opens thereby allowing the coolant fluid to circulate through cooling circuit 1002, i.e. allowing coolant fluid cooled by the radiator to flow from radiator passage 150 to engine 10 through thermostat 110 by means of pump 170. Apparatus 100 further allows circulation of coolant fluid through heating circuit 1003 enabling utilizing the heat generated by engine 10.

Figure 2A:
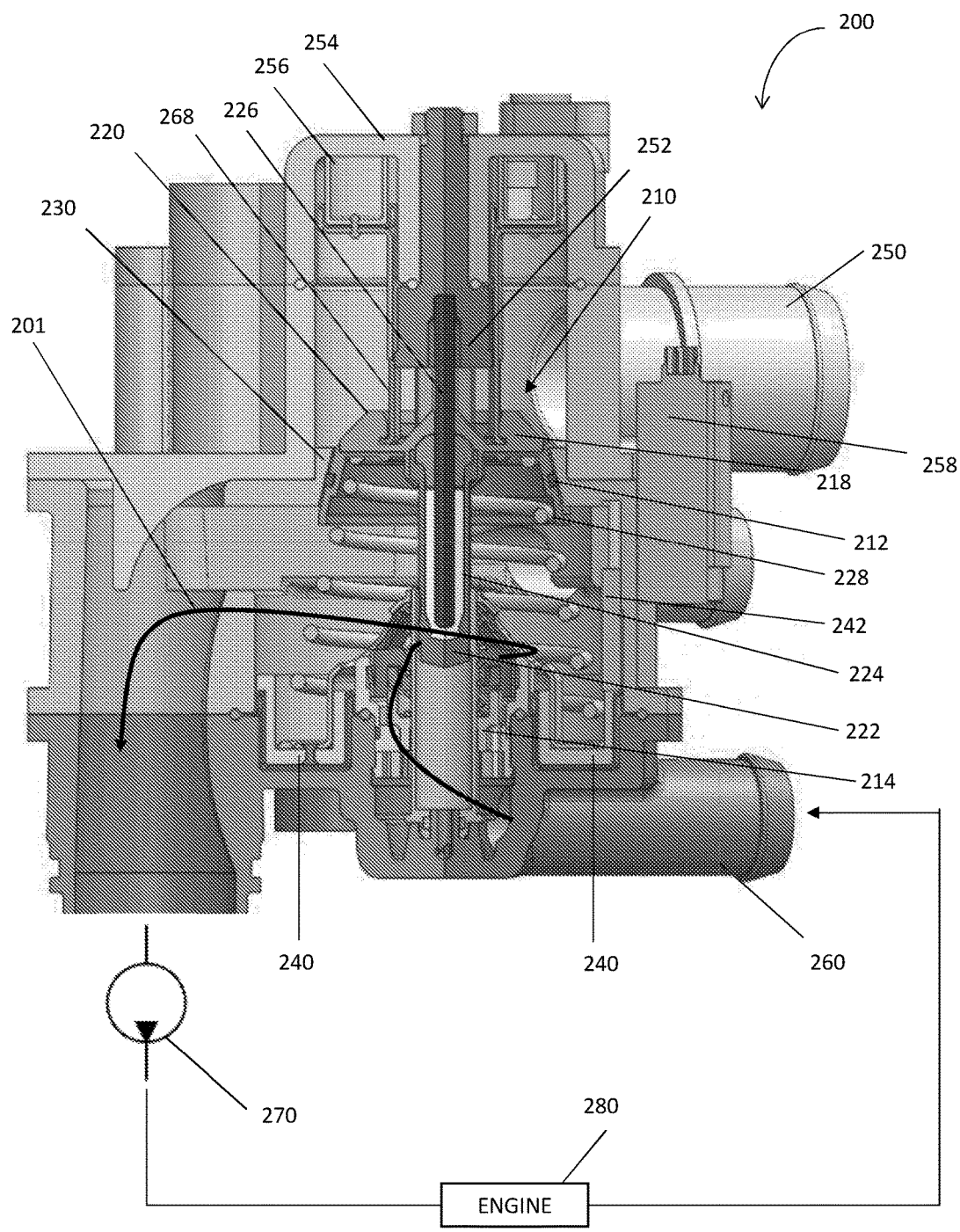
FIG. 2A schematically shows a cross-sectional view of an apparatus configured to control the flow of a coolant fluid from a radiator to an engine, according to some embodiments.

Reference is now made to FIG. 2A, which schematically shows a cross-sectional view of an apparatus 200 configured to control the flow of a coolant fluid from a radiator (not shown) through radiator passage 250 to an engine (such as engine 10 of FIG. 1A) through engine passage 280 in its closed operation mode. Apparatus 200 includes a thermostat 210 having a temperature sensitive valve 220 configured to block or allow flow of coolant fluid from radiator passage 250 to engine passage 280 through thermostat 210. Temperature sensitive valve 220 is here depicted as a linear characteristic valve configured to optimize the flow of coolant fluid when opened; however, fast opening valves or logarithmic valves may likewise be utilized and fall within the scope of this disclosure. Temperature sensitive valve 220 includes a valve body 222 containing a heat sensitive material 224 configured to expand above a predetermined temperature, and a displaceable pin 226 partially disposed within heat sensitive material 224 and partially projecting into niche 252 of thermostat 210. Temperature sensitive valve 220 further includes an upper lid 218, and a flange 212 associated with or integrally formed with upper lid 218. Displaceable pin 226 is movably disposed through upper lid 218. Thermostat 210 further includes a valve seat 230 located circumferentially to flange 212. In its closed operation mode (as depicted in FIG. 2A), flange 212 of temperature sensitive valve 220 seals against valve seat 230, thereby preventing flow of coolant fluid from radiator passage 250 to engine passage 280, through thermostat 210. Consequently, the coolant fluid circulates from the engine through a bypass channel 260, to thermostat 210, and back to the engine, by the means of a pump 270, as denoted by arrow 201. Temperature sensitive valve 220, further includes a spring 228 positioned between upper lid 218 and a support member 214. Spring 228 is configured to force closing of temperature sensitive valve 220, as long as a predetermined STO temperature (T1) has not been reached. Spring 228 is functionally associated with or connected to a piston 240 configured to control the compression (pre-load) of spring 228. The operation of piston 240 may be controlled by an actuator, such as hydraulic actuator 242. In the depicted normal position of piston 240, spring 228 is in equilibrium such that no (or a default) compression force is exerted on spring 228, prior to reaching the STO temperature (T1). That is, when thermostat 210 is in its closed operation mode and when piston 240 is in its normal position, spring 228 forces flange 212 of temperature sensitive valve 220 to seal with valve seat 230, thereby preventing flow of coolant fluid from radiator passage 250 to engine passage 280. Thermostat 210 further includes a hydraulic pressure compensation compartment 254 within which hydraulic pressure compensation element 256 is movably positioned. Hydraulic pressure compensation element 256 is connected to flange 112, through connecting element 268, such that when flange 112 is in its closed position, sealing against valve seat 230, hydraulic pressure compensation element 256 is in its elevated position, thereby ensuring maximum compensation for the pressure exerted by the coolant fluid on lid 118. It is thus understood that the position of the hydraulic pressure compensation element 256 within hydraulic pressure compensation compartment 254 may be (passively) controlled by the position of flange 112 within thermostat 210 and by connecting element 268. In addition, the position of hydraulic pressure compensation element 256 within hydraulic pressure compensation compartment 254 may further be (actively) controlled by an actuator, such as actuator 258, as further described herein. It is further understood, that due to the pressure compensation provided by hydraulic pressure compensation element 256, the force needed to force temperature sensitive valve 220 to seal with valve seat 230 is reduced, and thus the spring constant of spring 228 may be relatively low, such as 50 Newton/meter or below.

Figure 2B:
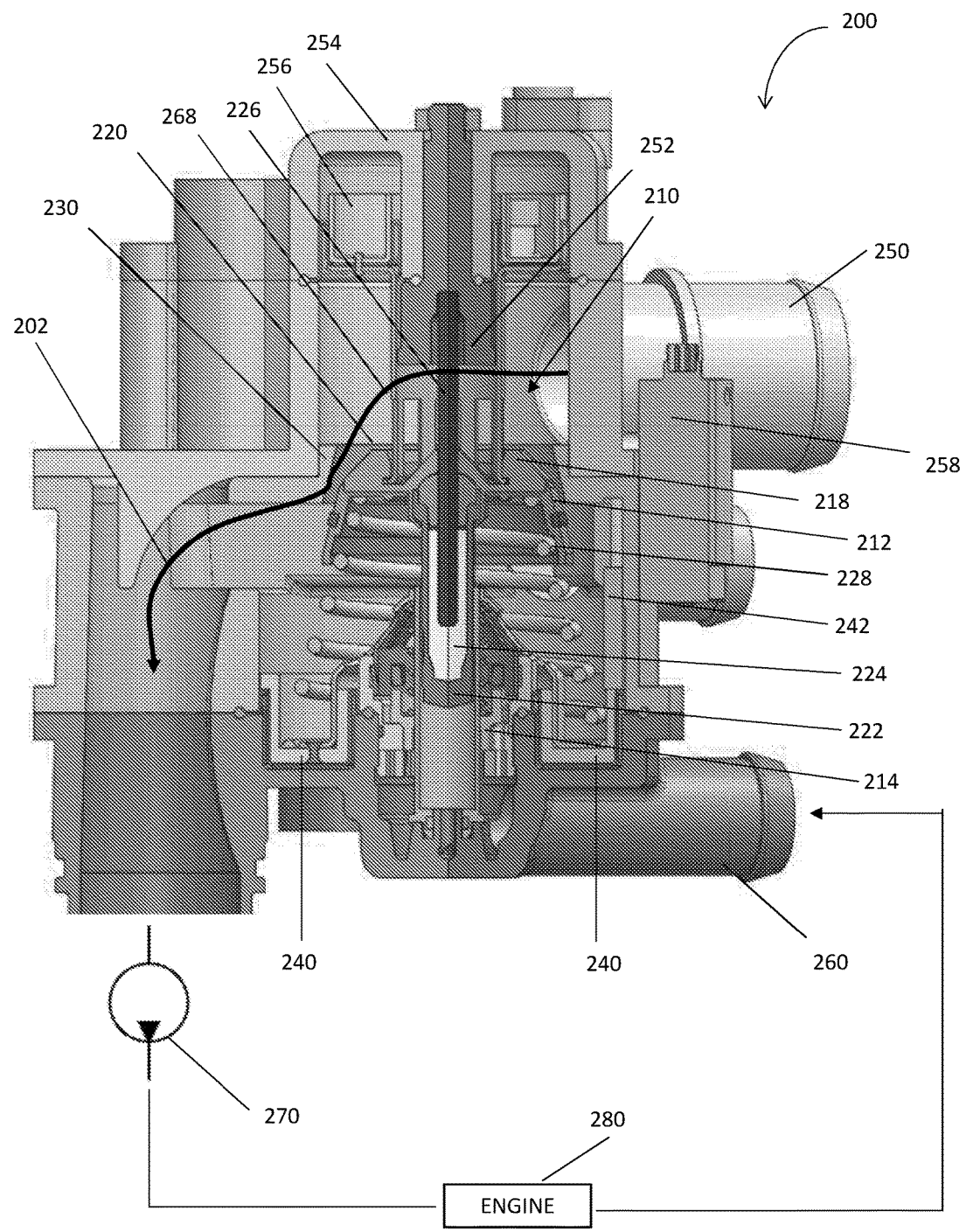
FIG. 2B schematically shows a cross-sectional view of an apparatus configured to control the flow of a coolant fluid from a radiator to an engine, according to some embodiments.

Reference is now made to FIG. 2B, which schematically shows a cross-sectional view of apparatus 200 in its open operation mode. Apparatus 200 includes thermostat 210 with temperature sensitive valve 220 configured to block or allow flow of coolant fluid from radiator passage 250 to engine passage 280 through thermostat 210. Temperature sensitive valve 220 includes valve body 222 containing heat sensitive material 224. When the coolant fluid gets heated to or above the predetermined STO temperature (T1), heat sensitive material 224 expands thereby causing displaceable pin 226 to be partially thrusted out of valve body 222. Due to the contra force provided by niche 252 to the displacement of pin 226, spring 228 is compressed leading temperature sensitive valve 220 to be gradually displaced from valve seat 230, thereby generating a pass for coolant fluid cooled by a radiator, from radiator passage 250, to thermostat 210 and, by means of pump 270, to engine passage 280, as denoted by arrow 202. That is, when thermostat 210 is in its open operation mode and when piston 240 is in its normal position, spring 228 is compressed, forcing flange 212 of temperature sensitive valve 220 to detach from valve seat 230, thereby allowing flow of coolant fluid from radiator passage 250 through engine passage 280. As a consequence of the displacement (lowering) of flange 212, the position of hydraulic pressure compensation element 256 within hydraulic pressure compensation compartment 254 is likewise lowered due to the interconnection of hydraulic pressure compensation element 256 and connecting element 268. It is thus understood, that the pressure compensation provided by hydraulic pressure compensation element 256 remains unchanged.

Figure 2C:
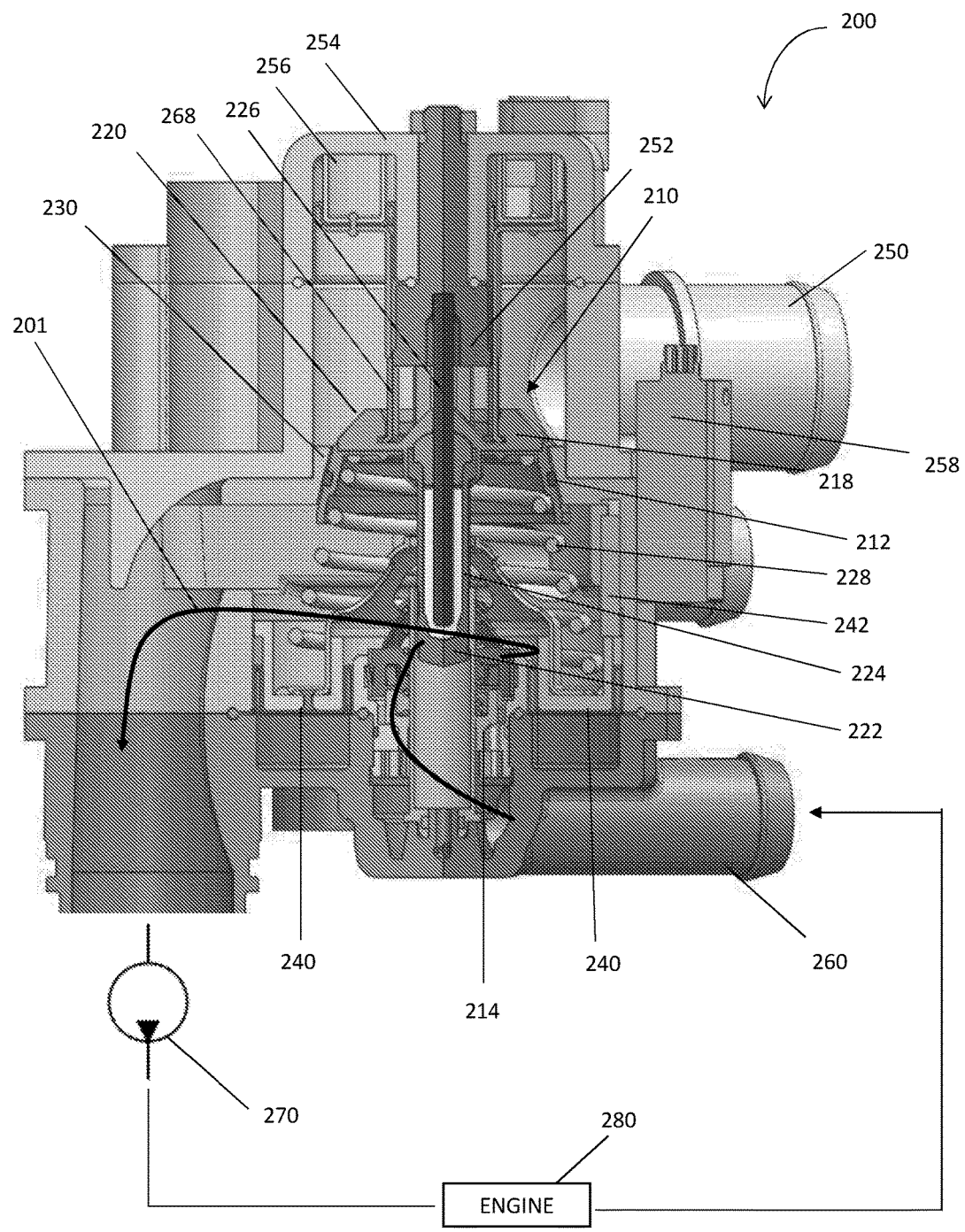
FIG. 2C schematically shows a cross-sectional view of an apparatus configured to control the flow of a coolant fluid from a radiator to an engine, according to some embodiments.
Figure 2D:
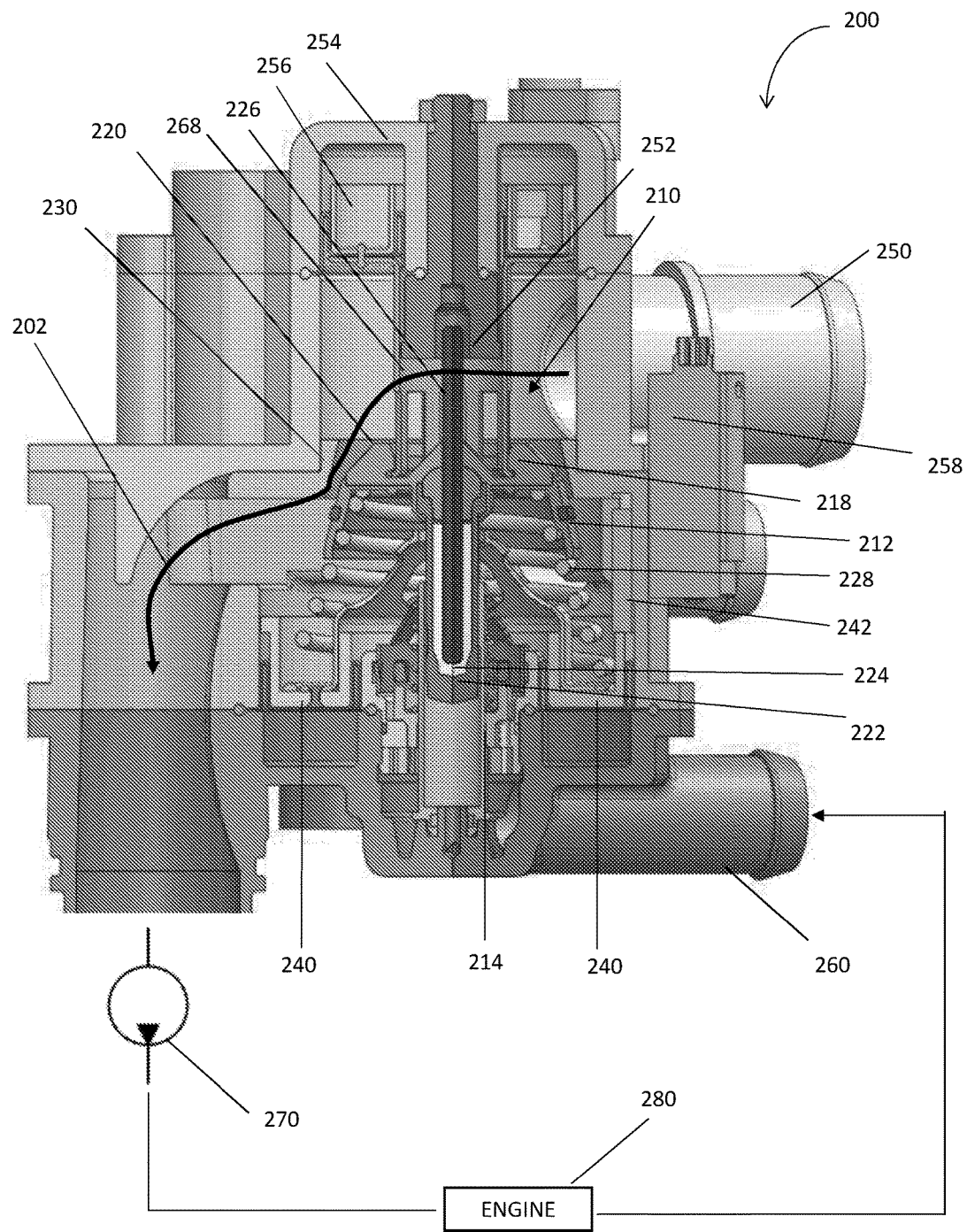
FIG. 2D schematically shows a cross-sectional view of an apparatus configured to control the flow of a coolant fluid from a radiator to an engine, according to some embodiments.

Reference is now made to FIGS. 2C and 2D which schematically show a cross-sectional view of apparatus 200, having piston 240 in a heightened position. Due to the heightened position of piston 240, a compression force is exerted on spring 228 from a bottom end thereof (without changing the position of flange 212 within thermostat 210), prior to engine temperature reaching the predetermined STO temperature (T1). As a result, a new and higher STO temperature (T2, wherein T2>T1) must be reached for valve 220 to be displaced from valve seat 230. In its closed operation mode (depicted in FIG. 2C), flange 212 of temperature sensitive valve 220 seals against the lowered valve seat 230, thereby preventing flow of coolant fluid from radiator passage 250 to engine passage 280, through thermostat 210. Consequently, the coolant fluid circulates from the engine through bypass channel 260, through thermostat 210 and back to the engine, by the means of a pump 270, as denoted by arrow 201. When the coolant fluid is heated to the previous predetermined STO temperature (T1), the valve remains closed, as additional compression of spring 228 is required, for temperature sensitive valve 220 to be displaced from valve seat 230. Flow of coolant fluid from radiator passage 250 thus remains blocked. Only when the coolant fluid gets heated above the new and higher STO temperature (T2) (as depicted in FIG. 2D), will the force generated by the expansion of heat sensitive material 224 and the thrusting out of displaceable pin 226 be enough to displace temperature sensitive valve 220 from valve seat 230, thereby generating a pass allowing coolant fluid cooled by the radiator to flow from radiator passage 250 to thermostat 210 and subsequently to enter engine passage 280, by the means of pump 270, as denoted by arrow 202. It is understood that this operation mode of apparatus 200 enables circumventing cooling of the engine even when the predetermined STO has been reached. This may be particularly beneficial at the beginning of a drive and/or at low ambient temperatures in that it prevents unnecessary cooling of a cold engine, thereby improving fuel economy and also reducing pollution. It is further understood that as the position of flange 212 within thermostat 210 is unchanged, the position of hydraulic pressure compensation element 256 within hydraulic pressure compensation compartment 254 (and thus the degree of pressure compensation provided) is unaffected by the position of piston 240 and remains directly proportional to the degree of opening of temperature sensitive valve 220, i.e. the degree of displacement of flange 212 from valve seat 230.

Figure 2E:
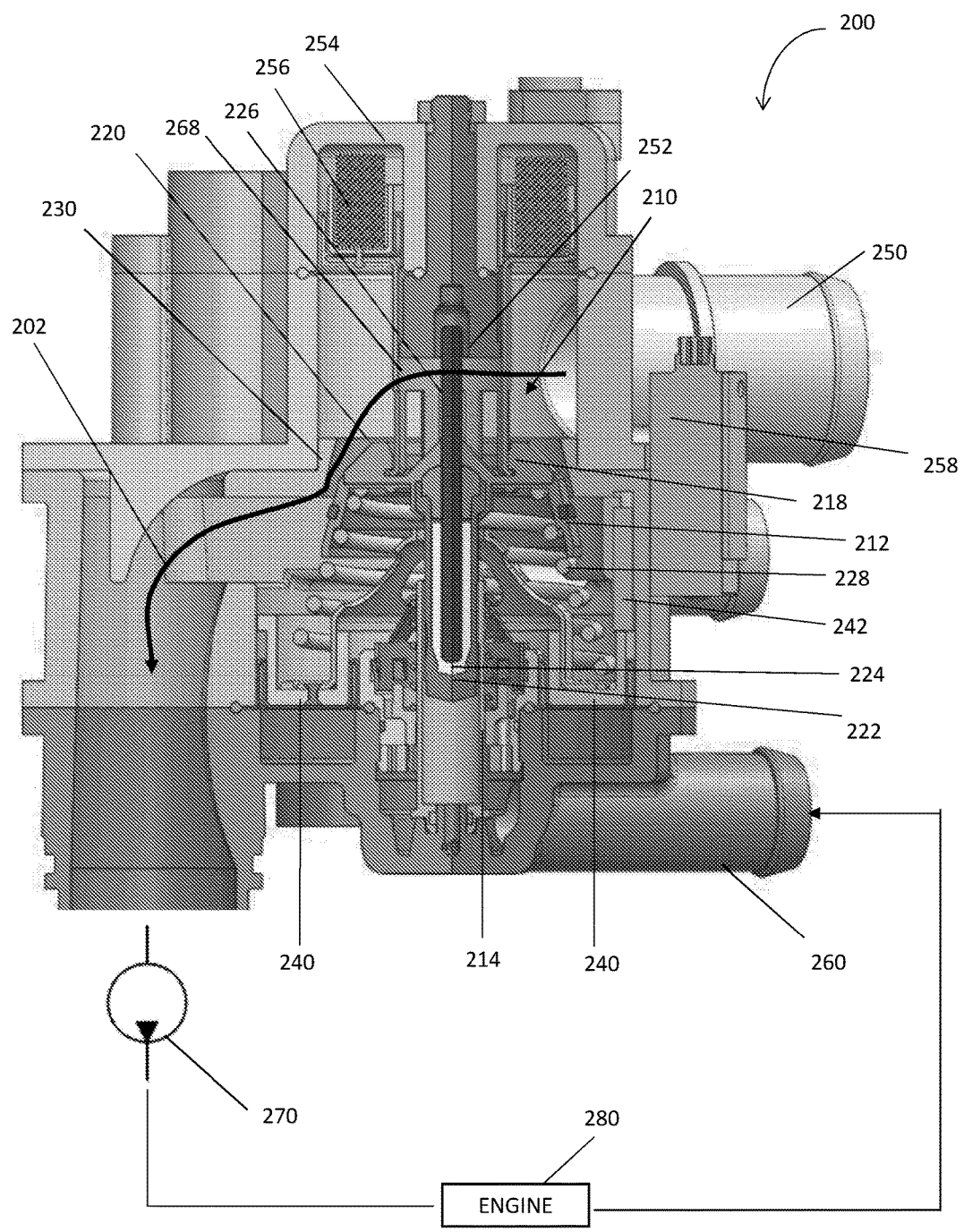
FIG. 2E schematically shows a cross-sectional view of an apparatus configured to control the flow of a coolant fluid from a radiator to an engine, according to some embodiments.

Reference is now made to FIG. 2E, which schematically shows a cross-sectional view of apparatus 200 having pressure compensation element 256 positioned in a lowered position owing to activation of actuator 258. Due to the actively lowered position of hydraulic pressure compensation element 256 within hydraulic pressure compensation compartment 254, flange 212 is forced downwards, thereby exerting a compression force causing the displacement of temperature sensitive valve 220 from valve seat 230 prior to the temperature of the coolant fluid having reached the predetermined STO temperature (T1), thereby overriding the function of valve 220 and allowing flow of coolant fluid from radiator passage 250 to engine passage 280, through thermostat 210, as denoted by arrow 202. It is understood that due to spring 228 having a relatively low spring constant and due to the fact that the pressure exerted by the coolant fluid on lid 218 of temperature sensitive valve 220 is increased (since the degree of pressure compensation provided by hydraulic pressure compensation element 256 is reduced), the force required for connecting element 268 to displace temperature sensitive valve 220 from valve seat 230 is significantly lowered. It is understood that this operation mode of apparatus 200 enables cooling the engine even when the predetermined STO has not been reached, thereby reducing and maintaining a cooler engine temperature with higher engine power, which may be particularly beneficial for high performance turbo applications.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" or "comprising," when used in this specification, specify the presence of stated features, integers, steps, operations, elements, or components, but do not preclude or rule out the presence or addition of one or more other features, integers, steps, operations, elements, components, or groups thereof.

While a number of exemplary aspects and embodiments have been discussed above, those of skill in the art will recognize certain modifications, additions and sub-combinations thereof. It is therefore intended that the following appended claims and claims hereafter introduced be interpreted to include all such modifications, additions and sub-combinations as are within their true spirit and scope.

The invention claimed is:

1. A thermostat for controlling flow of a coolant fluid through an aperture, the thermostat comprising:
 a temperature sensitive valve for controlling the opening and closing of the aperture, said temperature sensitive valve comprising:
  a valve body comprising a heat sensitive material and a displaceable pin; wherein said displaceable pin is at least partially inserted within said heat sensitive material;
  a flange configured to delimit the temperature sensitive valve from a top end thereof, said flange configured to seal against a valve seat when said temperature sensitive valve is closed;
  a support member configured to delimit the temperature sensitive valve from a bottom end thereof; and
  a flexible member located between said flange and said support member;
  wherein when said heat sensitive material is heated said displaceable pin is at least partially displaced from said valve body, thereby affecting a compression force on said flexible member, said compression force gradually displacing said temperature sensitive valve from said valve seat, thereby allowing flow of coolant fluid through said aperture;

a piston configured to control compression of said flexible member from a bottom end thereof; and a hydraulic pressure compensation element connected to said flange and configured to compensate for a hydraulic pressure exerted by said coolant fluid on a lid of said temperature sensitive valve.

2. The thermostat of claim 1, wherein when said temperature sensitive valve is opened said hydraulic pressure compensation element is lowered to a lower position.

3. The thermostat of claim 1, further comprising an actuator configured to control the operation of said hydraulic pressure compensation element.

4. The thermostat of claim 1, wherein said actuator, when activated, is configured to reduce a degree of compensation provided by said hydraulic pressure compensation element.

5. The thermostat of claim 4, wherein when said actuator is activated and said degree of compensation is reduced, a start-to-open (STO) temperature of said temperature sensitive valve is lowered, as compared to when said actuator is not activated.

6. The thermostat of claim 1, wherein when said actuator lowers said hydraulic pressure compensation element into a lower position, said temperature sensitive valve is displaced from said valve seat.

7. The thermostat of claim 1, wherein said piston is connected to said flexible member.

8. The thermostat of claim 7, wherein said piston is configured to switch between a normal position and a heightened position.

9. The thermostat of claim 8, wherein when said piston is in its heightened position, said piston exerts a compression force on said flexible member.

10. The thermostat of claim 9, wherein when said piston is in its heightened position, a STO temperature of said temperature sensitive valve is heightened, as compared to when said piston is in its normal position.

11. The thermostat of claim 1, wherein the position of said support member is fixed.

12. The thermostat of claim 1, wherein said flexible member is a spring.

13. The thermostat of claim 12, wherein said spring has a spring constant of 100 Newton/meter or less.

14. The thermostat of claim 12, wherein said spring has a spring constant of 50 Newton/meter or less.

15. The thermostat of claim 1, wherein said heat sensitive material is a wax.

16. The thermostat of claim 1, wherein said temperature sensitive valve is a linear characteristic valve.

17. A thermostat system for controlling a temperature of an engine, the system comprising:
    a radiator configured to cool a coolant fluid;
    a temperature sensitive valve for controlling the opening and closing of the aperture, said temperature sensitive valve comprising:
        a valve body comprising a heat sensitive material and a displaceable pin; wherein said displaceable pin is at least partially inserted within said heat sensitive material;
        a flange configured to delimit the temperature sensitive valve from a top end thereof, said flange configured to seal against a valve seat when said temperature sensitive valve is closed;
        a support member configured to delimit the temperature sensitive valve from a bottom end thereof; and
        a flexible member located between said flange and said support member;
        wherein when said heat sensitive material is heated, said displaceable pin is at least partially displaced from said valve body, thereby affecting a compression force on said flexible member, said compression force gradually displacing said temperature sensitive valve from said valve seat, thereby allowing flow of coolant fluid through said aperture;
    a piston configured to control compression of said flexible member from a bottom end thereof; and
    a hydraulic pressure compensation element connected to said flange and configured to compensate for a hydraulic pressure exerted by said coolant fluid on a lid of said temperature sensitive valve.

18. The thermostat system of claim 17, further comprising a bypass circuitry configured to circulate said coolant fluid between said engine and said thermostat.

19. The thermostat system of claim 17, further comprising a pump configured to pump coolant fluid from said thermostat to said engine.

* * * * *